US007865593B2

(12) United States Patent
Yang et al.

(10) Patent No.: US 7,865,593 B2
(45) Date of Patent: Jan. 4, 2011

(54) APPARATUS AND METHOD FOR MANAGING A NETWORK

(75) Inventors: Chen-Yui Yang, Marlboro, NJ (US); Paritosh Bajpay, Edison, NJ (US); Mary-Elise Haug, Indianapolis, IN (US)

(73) Assignee: AT&T Intellectual Property I, L.P., Reno, NV (US)

( * ) Notice: Subject to any disclaimer, the term of this patent is extended or adjusted under 35 U.S.C. 154(b) by 204 days.

(21) Appl. No.: 12/187,891

(22) Filed: Aug. 7, 2008

(65) Prior Publication Data
US 2010/0036939 A1 Feb. 11, 2010

(51) Int. Cl.
*G06F 15/16* (2006.01)
(52) U.S. Cl. .................................. 709/224; 709/223
(58) Field of Classification Search ............... 709/223, 709/224, 225, 248, 249; 370/216, 242
See application file for complete search history.

(56) References Cited

U.S. PATENT DOCUMENTS

| | | | | |
|---|---|---|---|---|
| 7,545,750 | B2 * | 6/2009 | Yasuie et al. ................. | 370/242 |
| 7,570,580 | B1 * | 8/2009 | Bajpay et al. ................ | 370/216 |
| 2002/0093954 | A1 * | 7/2002 | Weil et al. .................... | 370/389 |
| 2002/0162045 | A1 * | 10/2002 | Shiragaki ....................... | 714/4 |
| 2004/0008988 | A1 * | 1/2004 | Gerstal et al. ................. | 398/45 |
| 2006/0227714 | A1 | 10/2006 | Griffin et al. | |
| 2006/0285487 | A1 * | 12/2006 | Yasuie et al. ................. | 370/216 |
| 2007/0014232 | A1 * | 1/2007 | Yasuie et al. ................. | 370/216 |
| 2008/0123524 | A1 | 5/2008 | Vasseur et al. | |
| 2008/0137549 | A1 * | 6/2008 | Manthoulis .................. | 370/252 |
| 2008/0201731 | A1 * | 8/2008 | Howcroft ....................... | 725/13 |
| 2009/0064248 | A1 * | 3/2009 | Kwan et al. .................. | 725/109 |
| 2009/0125953 | A1 * | 5/2009 | Porter et al. ................. | 725/109 |
| 2010/0023994 | A1 * | 1/2010 | Taylor et al. ................. | 725/148 |

* cited by examiner

*Primary Examiner*—Krisna Lim
(74) *Attorney, Agent, or Firm*—Andrew Gust; Guntin Meles & Gust

(57) ABSTRACT

A system that incorporates teachings of the present disclosure may include, for example, a server comprising a controller to monitor a physical layer, a data link layer and a network layer of an Internet Protocol Television (IPTV) network, obtain a plurality of alarm signals from one or more of the physical layer, the data link layer and the network layer that are associated with an undesired condition of the IPTV network, synthesize the plurality of alarm signals to determine a correlation, obtain topology information associated with network devices in the IPTV network, and isolate the undesired condition to a network component in the IPTV network using the correlation and the topology information. Other embodiments are disclosed.

25 Claims, 13 Drawing Sheets

200

300

500

1100

APPARATUS AND METHOD FOR MANAGING A NETWORK

FIELD OF THE DISCLOSURE

The present disclosure relates generally to communication systems and more specifically to an apparatus and method for managing a network.

BACKGROUND

Communication networks, can be subject to various undesired conditions that can have an adverse impact on customers, such as disabling connections. The cause of such undesired conditions can vary, including equipment failure. Providing alerts associated with particular equipment may give a service provider a tool with which to monitor events in the network.

However, these alerts can result in false detections of equipment failure, such as where a busy network experiencing latency triggers an alert for a particular piece of equipment. Moreover, alerts can be generated for multiple devices that are being affected by a single device or component failure. The issuance of false detections of equipment failure can be exacerbated by a routing protocol where customer traffic has priority over network management traffic.

DETAILED DESCRIPTION

Figure 1:
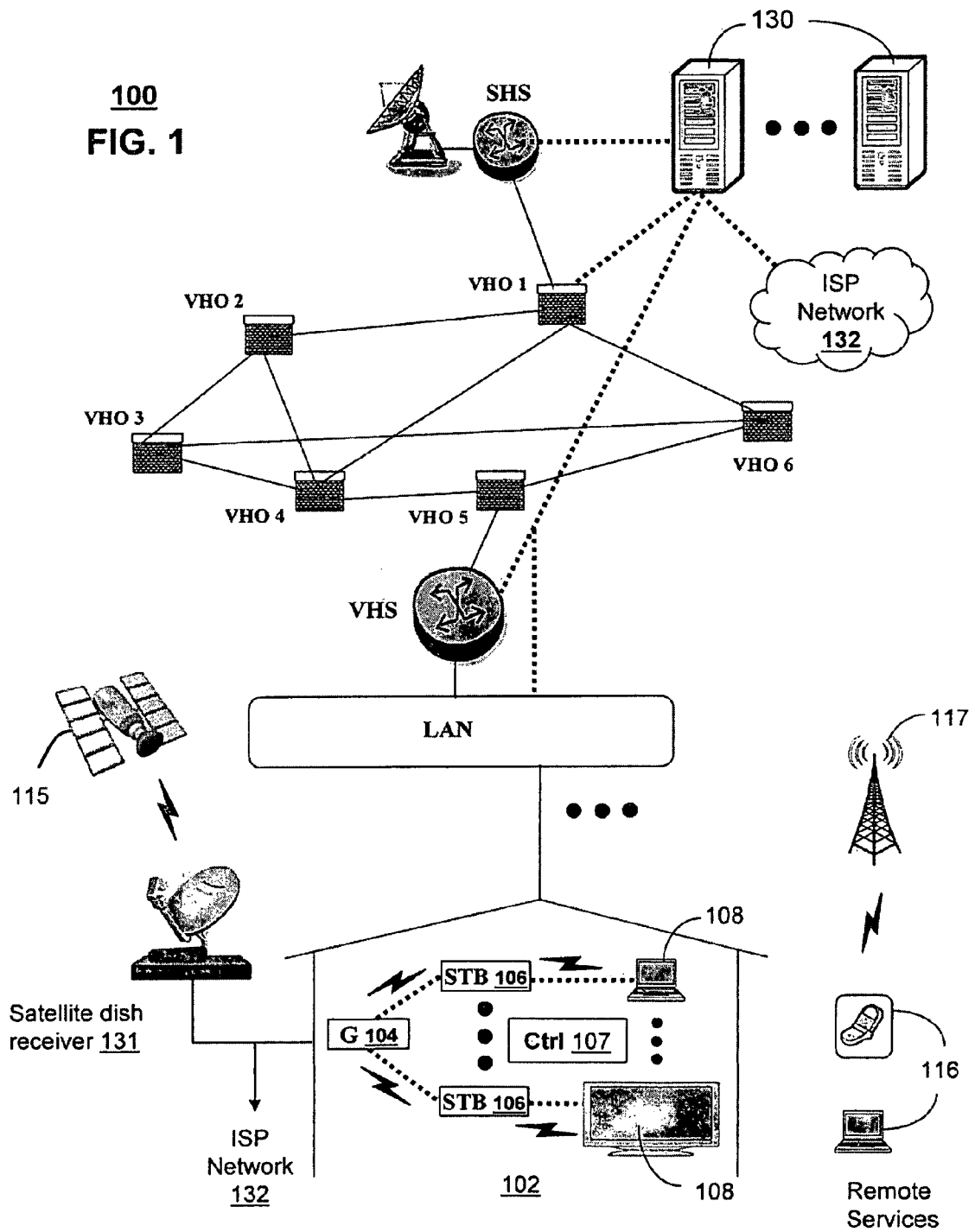
FIGS. 1-4 depict exemplary embodiments of communication systems that provide media services.

One embodiment of the present disclosure entails a computer-readable storage medium comprising computer instructions for monitoring a physical layer, a data link layer and a network layer of an Internet Protocol Television (IPTV) network, obtaining a plurality of alarm signals from one or more of the physical layer, the data link layer and the network layer that are associated with an undesired condition of the IPTV network, obtaining one or more customer reports associated with me undesired condition, synthesizing the plurality of alarm signals and the one or more customer reports to determine a correlation, obtaining topology information associated with network devices in the IPTV network, isolating the undesired condition to a network component in the IPTV network using the correlation and the topology information, and performing remote testing of the network component to validate the isolation of the undesired condition.

Another embodiment of the present disclosure entails a server comprising a controller to monitor a physical layer, a data link layer and a network layer of an IPTV network, obtain a plurality of alarm signals from one or more of the physical layer, the data link layer and the network layer that are associated with an undesired condition of the IPTV network, synthesize the plurality of alarm signals to determine a correlation, obtain topology information associated with network devices in the IPTV network, and isolate the undesired condition to a network component in the IPTV network using the correlation and the topology information.

Yet another embodiment of the present disclosure entails a server comprising a controller to monitor an IPTV network having a physical layer, a data link layer and a network layer, obtain a plurality of alarm signals from one or more of the physical layer, the data link layer and the network layer that are associated with an undesired condition of the IPTV network, obtain one or more customer reports associated with the undesired condition, synthesize the plurality of alarm signals and the one or more customer reports to determine a correlation, isolate the undesired condition to a network component in the IPTV network using the correlation, and perform remote testing of the network component to validate the isolation of the undesired condition.

Yet another embodiment of the present disclosure entails a network device comprising a controller to transmit a plurality of alarm signals to a management server, wherein the plurality of alarm signals indicate an undesired condition associated with each of a physical layer, a data link layer and a network layer of an IPTV network, wherein the undesired condition is isolated by the management server to a network component in the IPTV network using a correlation and topology information, wherein the correlation is determined by the management server using the plurality of alarm signals and one or more customer reports associated with the undesired condition, and wherein the topology information is associated with network devices in the IPTV network.

Yet another embodiment of the present disclosure entails a method of managing an internet protocol media network involving monitoring a physical layer, a data link layer and a network layer of the network, obtaining a plurality of alarm signals from one or more of the physical layer, the data link layer and me network layer that are associated with an undesired condition of the network, obtaining one or more customer reports associated with the undesired condition, synthesizing the plurality of alarm signals and the one or more customer reports to determine a correlation, obtaining topology information associated with network devices in the network, and isolating the undesired condition to a network component in the network using the correlation and the topology information.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) or other access devices located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of Which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
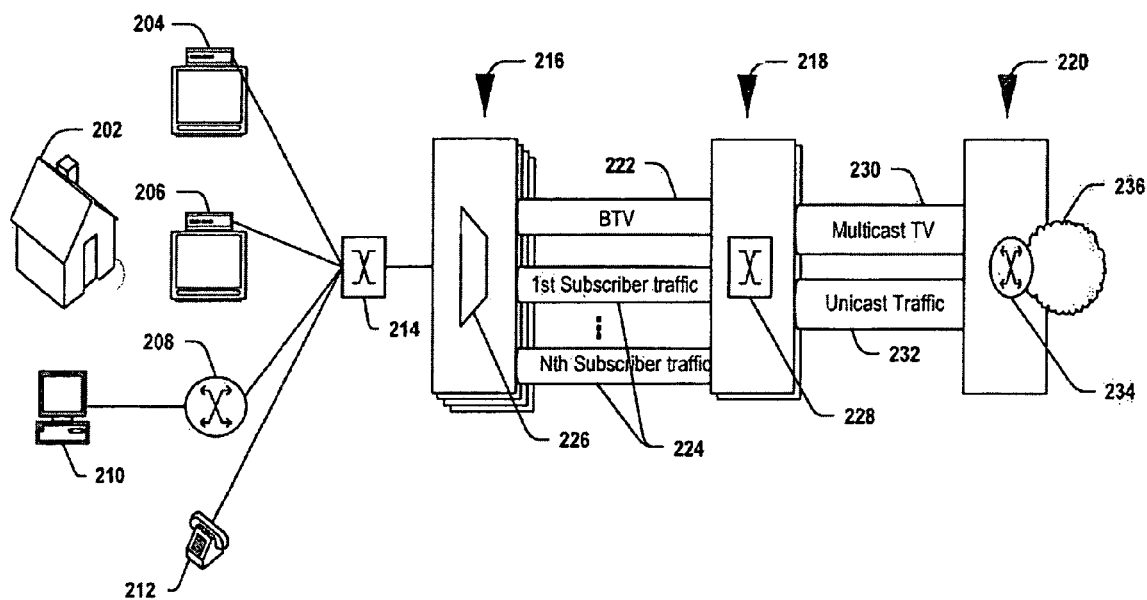

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-lop box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment; the access switch/router system 226 can include various access devices, such as a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214.

The system 200 can include a number of features which may or may not be used with the components and techniques that monitor for problems associated with the system and which as described again later. For instance, the channel selection data can include an Internet Group Management Protocol (IGMP) Join request. In an illustrative embodiment, the access switch/router system 226 can identify whether it is joined to a multicast group associated with the requested channel based on information in the IGMP Join request. If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
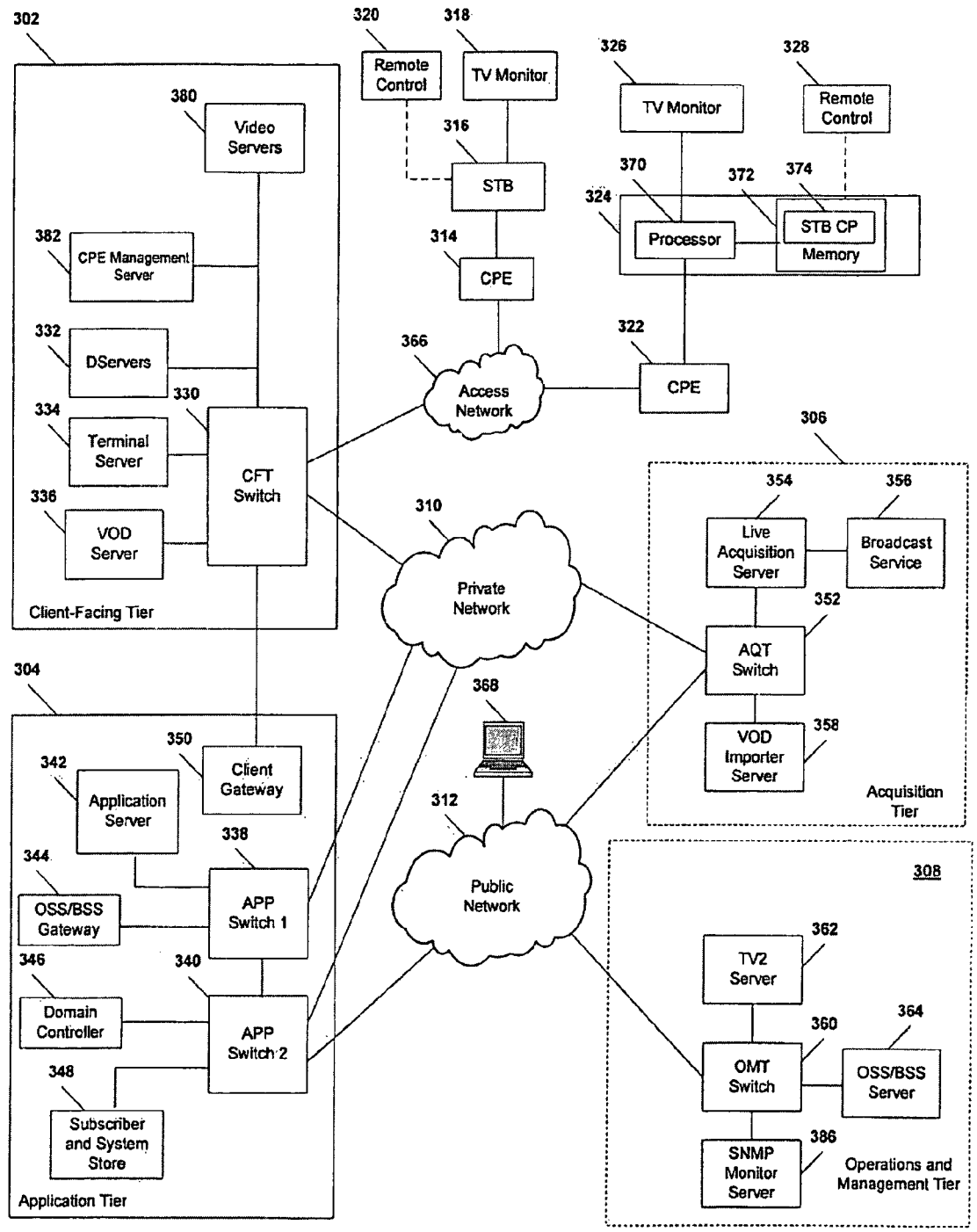

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video servers) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
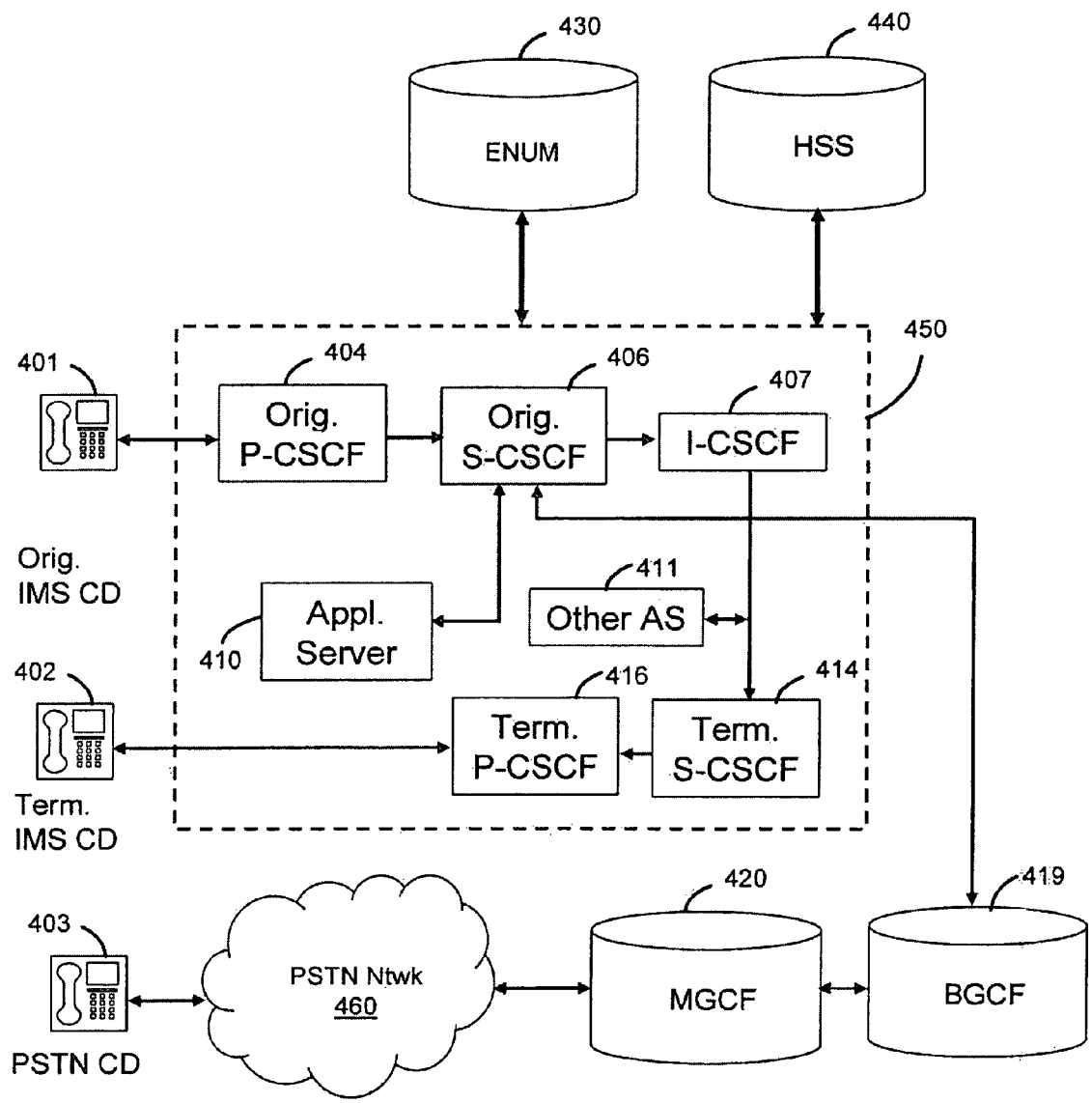

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
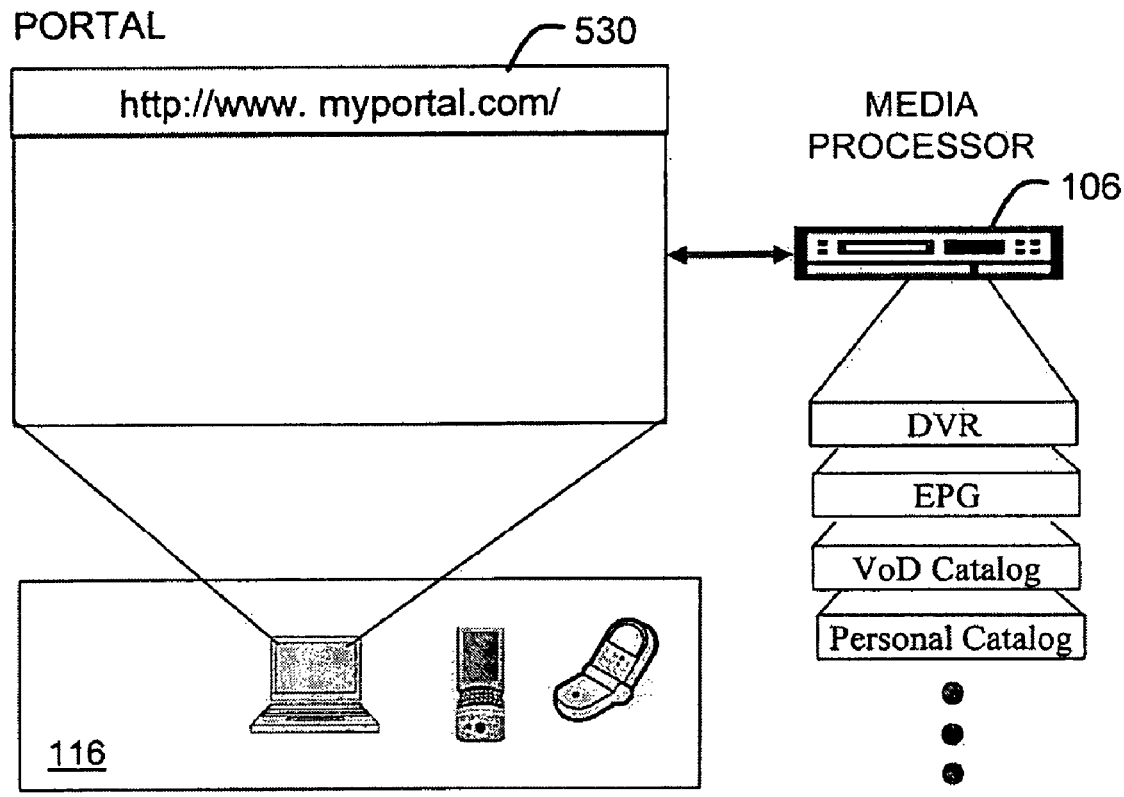
FIG. 5 depicts an exemplary embodiment of a portal interacting with at least one among the communication systems of FIGS. 1-4 and 6-7.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
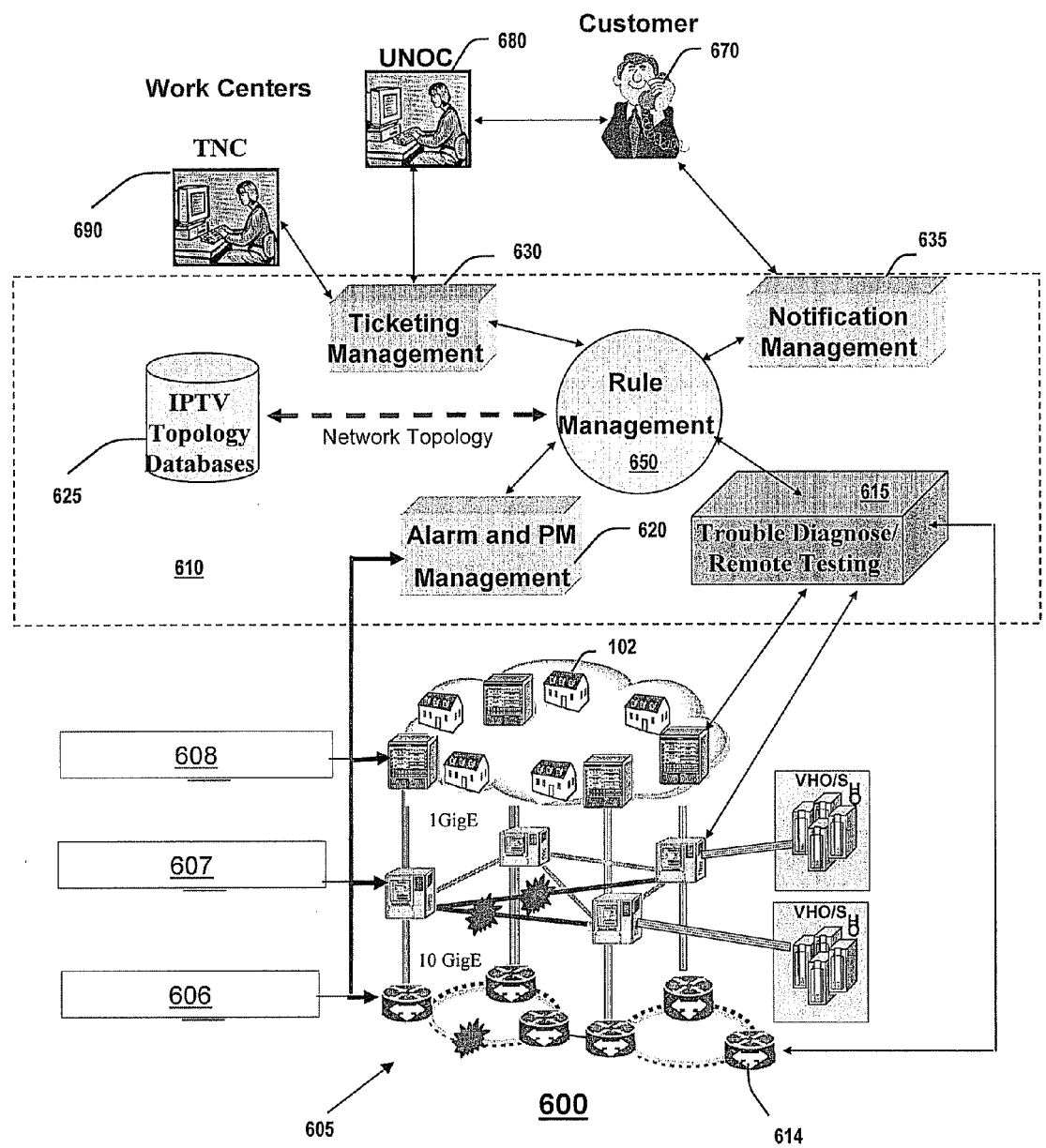
FIGS. 6-10 depict exemplary embodiments of communication systems that provide media services.

FIG. 6 depicts an exemplary embodiment of a communication system 600 for delivering media content. The communication system 600 can represent an IPTV broadcast media system. Communication system 600 can be overlaid or operably coupled with communication systems 100-400 as another representative embodiment of said communication systems.

System 600 can include a network 605 for delivery of the media content between the provider equipment (e.g., located at the video head office) and the customer's equipment (e.g., a gateway located at a residence). A number of network devices 614, including service routers and Ethernet switches, can be utilized for transporting the signals along the network 605. The network 605 can utilize a number of connection structures for providing a communication link between the network devices 614, including twisted pair lines, fiber lines and/or wireless connections.

System 600 can include a network management or monitoring system 610 operably connected to the network 605 and in communication with one or more of the network devices 614 therein. The management system 610 or portions thereof can be in communication with portions of the network 605 by way of wired and/or wireless links. The management system 610 can include a trouble monitoring module (TMM) 615, an alarm management module (AMM) 620, a topology database 625, a ticketing module 630, and a notification module 635 that are each in communication with a rule management module 650 (RMM). As will be discussed again later, the RMM 650 can be in communication with each of the modules 615, 620, 630 and 635 and the database 625 in order to perform a number of functions, including creating tickets or other indicia based on either or both of a system detected or customer reported trouble or failure; detecting an IPTV service outage by alarm collection to determine the failure type; correlation of the alarms and tickets to determine root cause events, such as due to either a Gigabit Ethernet Circuit or Reconfigurable Optical Add-Drop Multiplexer (ROADM) failure; verification of a 10 GigE line cards/ports to check local connectivity and configuration; performing layer 1 testing to verify physical stability of the network circuit; checking error free operation of the 10 GigE circuit, such as testing whether the throughput does not exceed the bandwidth specified in the traffic contract; and/or auto notification to appropriate work centers for processing, such as special handling repairs or reporting trouble status to the customer.

The ticketing module 630 can be in communication with one or more of customers 670, network operations centers (NOC) 680, and transport network centers (TNC) 690. It should be understood by one of ordinary skill in the art that the modules 615, 620, 630, 635 and 650 and the database 625 can be separate components of the management system 610 or one or more of these components can be incorporated together. In one embodiment, the AMM 620 can receive layer one alarms 606, layer two and three alarms 607, and/or customer premises equipment alarms 608. Other network devices can also provide alarms to AMM 620, including IPTV access devices, DSLAM's, Ethernet switches, routers, and/or SONET rings (e.g., network architecture with two or more transmission paths between network nodes, such as digital cross-connects or add/drop multiplexers). It should be further understood by one of ordinary skill in the art that other configurations for communication between the management system 610 and the network 605 are also contemplated including a decentralized system and/or a master-slave arrangement between intermediary communication devices coupling the network 605 with the management system 610: One or more of the components of the management system 610, such as the TMM 615 and the AAM 620, can also be in wireless communication with the network 605.

Figure 7:
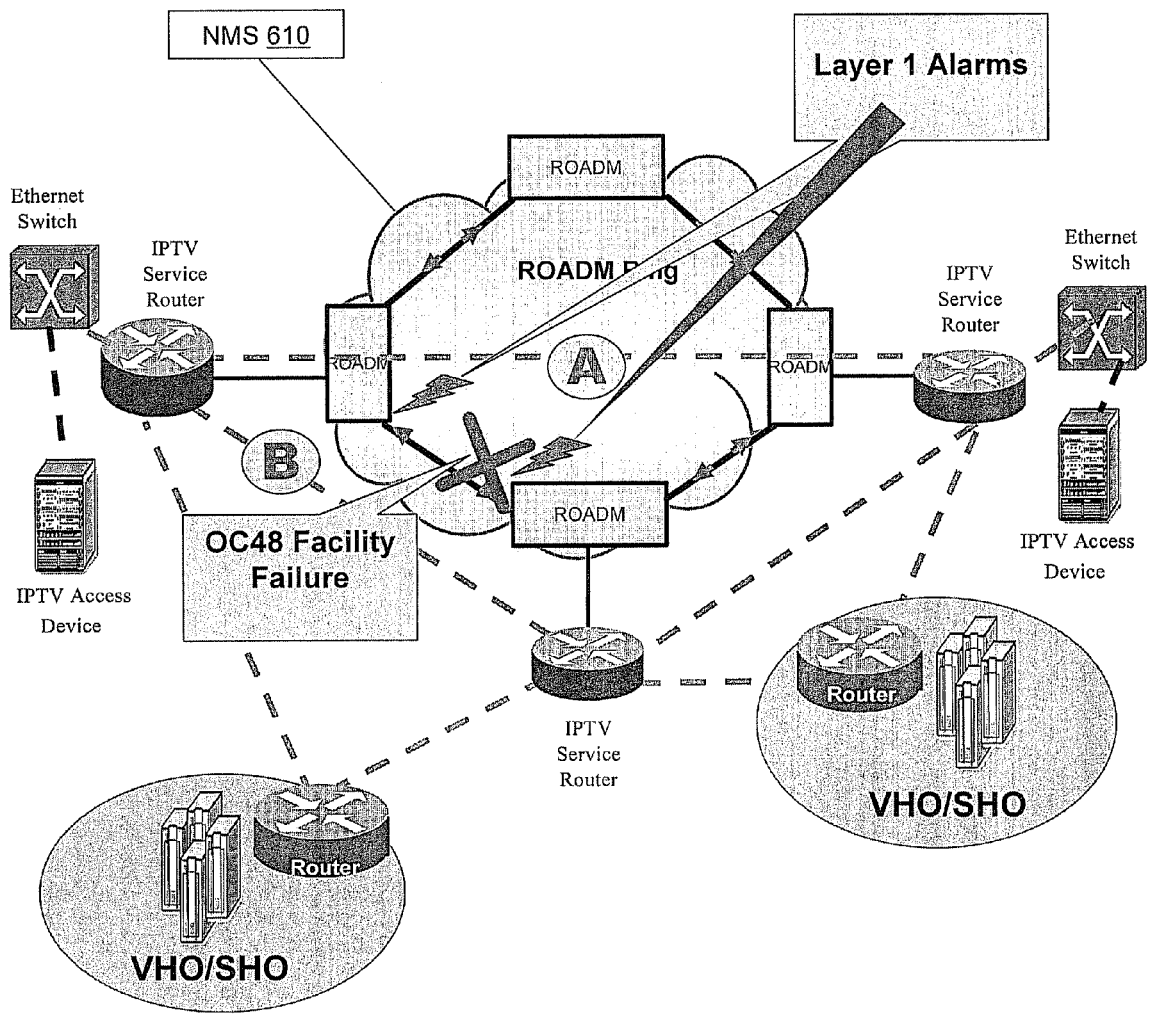

FIG. 7 depicts an exemplary embodiment of a communication system 700 for delivering media content. The communication system 700 can represent a portion of an IPTV broadcast media system. Communication system 700 can be overlaid or operably coupled with communication systems 100-400 and 600 as another representative embodiment of said communication systems.

System 700 can include a Reconfigurable Optical Add/Drop Multiplexer (ROADM) ring, a plurality of VHO's, customer equipment, and other network devices, including DSLAM's, switches, routers, and so forth. A network management system, such as NMS 610 can be in communication with system 700. In one failure scenario, a layer one alarm can be received which indicates a single facility failure. NMS 610 can open a trouble ticket with the TNC 690 for isolated layer one root cause troubles with affected customers/services for trouble dispatch. NOC 680 can be notified of the failure. The IPTV services may not be impacted by this failure scenario.

Figure 8:
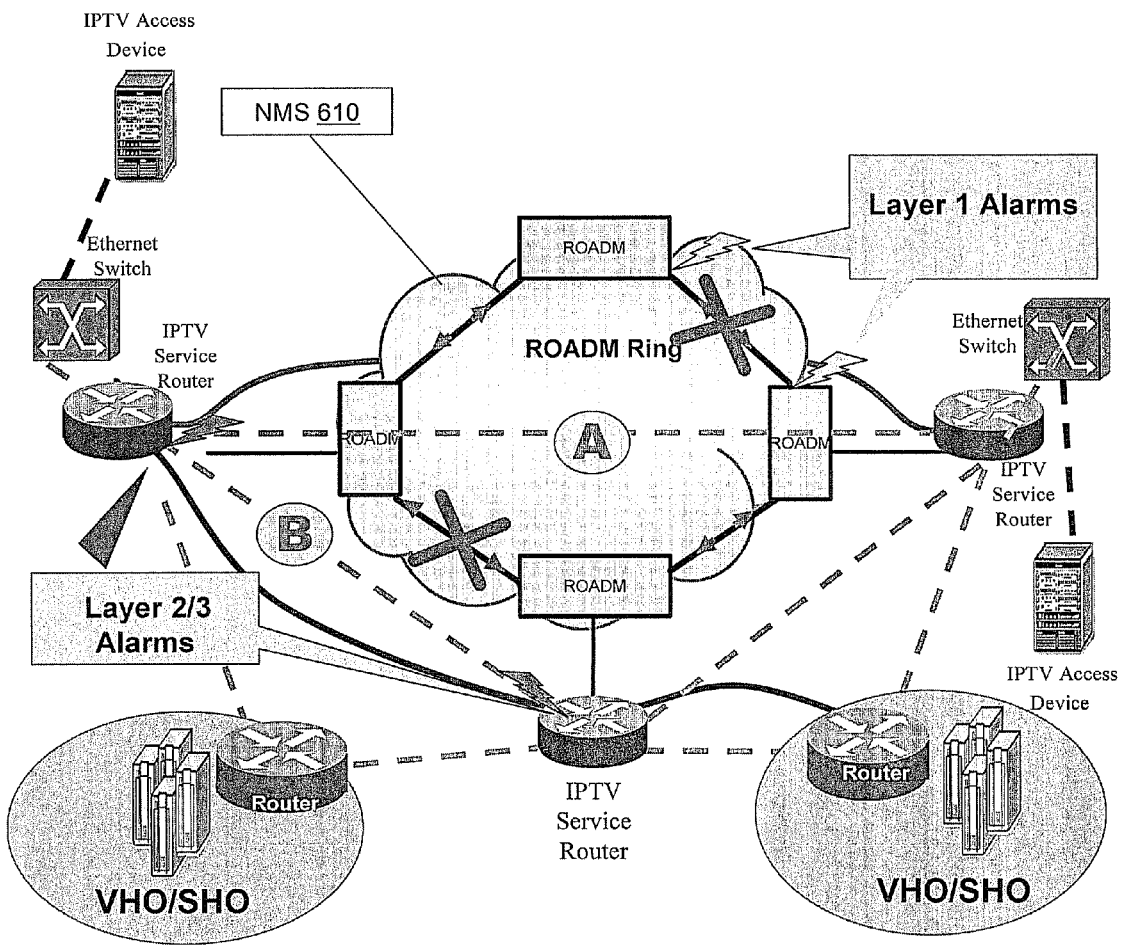

FIG. 8 depicts an exemplary embodiment of a communication system 800 for delivering media content. The communication system 800 can represent a portion of an IPTV broadcast media system. Communication system 800 can be overlaid or operably coupled with communication systems 100-400 and 600 as another representative embodiment of said communication systems.

System 800 can include a ROADM ring, a plurality of VHO's, customer equipment, and other network devices, including DSLAM's, switches, routers, and so forth. A network management system, such as NMS 610, can be in communication with system 800. In another failure scenario, an alarm can be received which indicates a 10 G link failure and/or an IP connectivity failure; such as an existing facility failure along with equipment failure. NMS 610 can open trouble tickets with TNC 690 for layer one root cause troubles with affected customers/services for trouble dispatch upon notifying NOC 680 to suppress its monitoring domain alarms. The IPTV services may potentially be impacted by this failure scenario.

Figure 9:
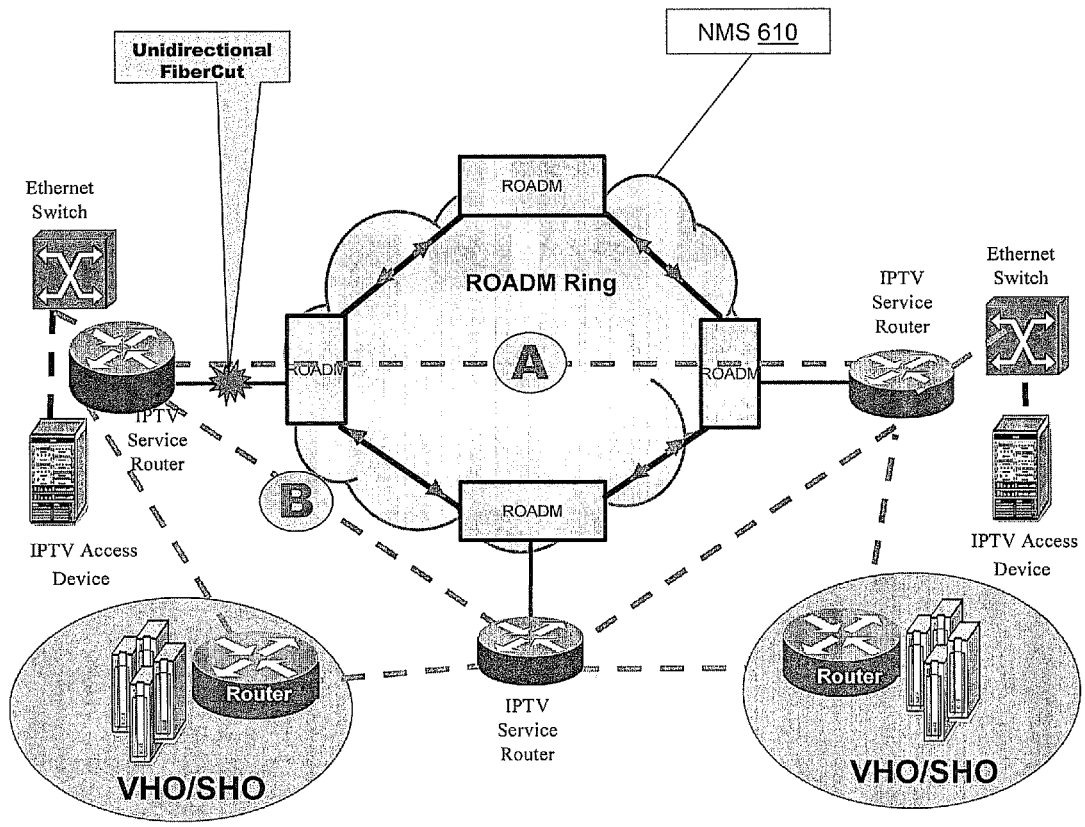

FIG. 9 depicts an exemplary embodiment of a communication system 900 for delivering media content. The communication system 900 can represent a portion of an IPTV broadcast media system. Communication system 900 can be overlaid or operably coupled with communication systems 100-400 and 600 as another representative embodiment of said communication systems.

System 900 can include a ROADM ring, a plurality of VHO's, customer equipment, and other network devices, including DSLAM's, switches, routers, and so forth. A network management system, such as NMS 610, can be in communication with system 900. In another failure scenario, an alarm can be received which indicates an undirectional fiber cut. NMS 610 can open trouble tickets with TNC 690 for layer one root cause troubles with affected customers/services for trouble dispatch upon notifying NOC 680 to suppress its monitoring domain alarms. The IPTV services may potentially be impacted by this failure scenario.

Figure 10:
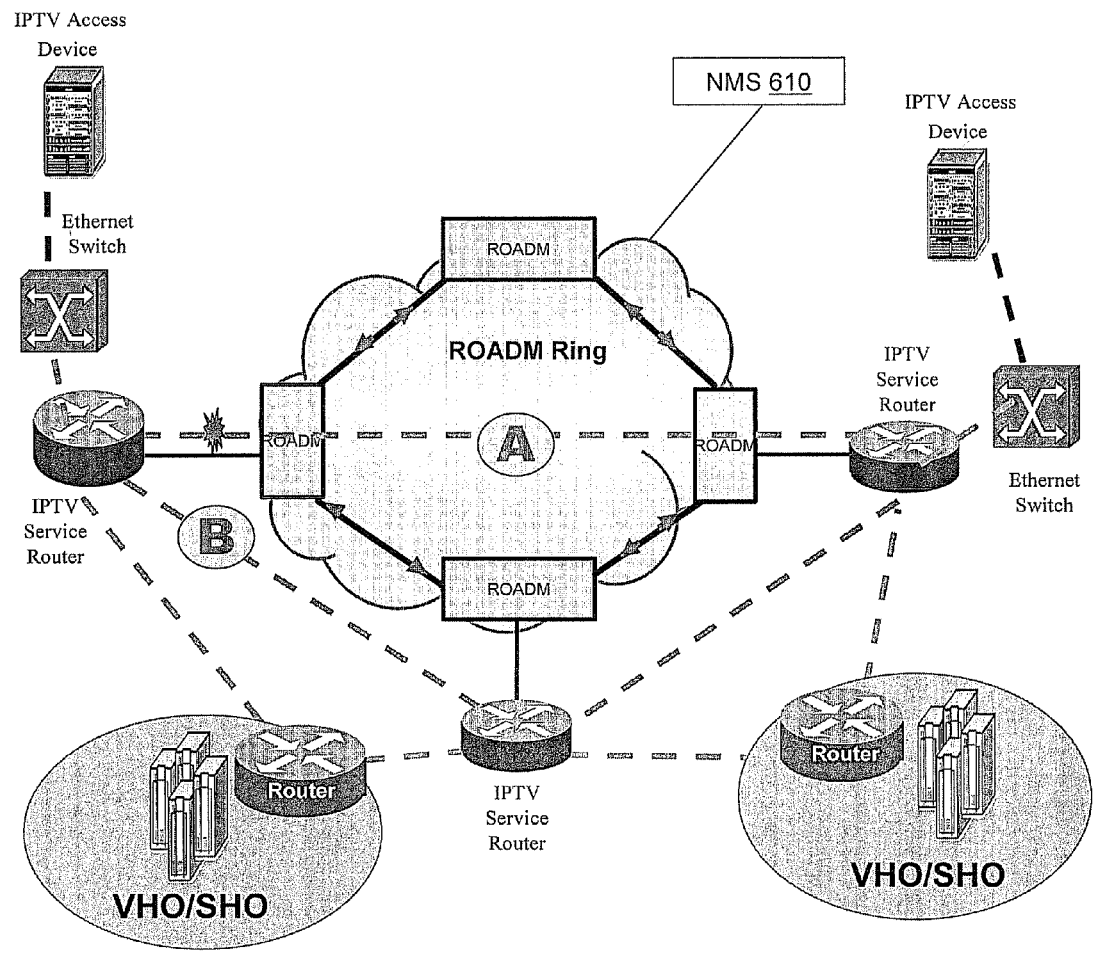

FIG. 10 depicts an exemplary embodiment of a communication system 1000 for delivering media content. The communication system 1000 can represent a portion of an IPTV broadcast media system. Communication system 1000 can be overlaid or operably coupled with communication systems 100-400 and 600 as another representative embodiment of said communication systems.

System 1000 can include a ROADM ring, a plurality of VHO's, customer equipment, and other network devices, including DSLAM's, switches, routers, and so forth. A network management system, such as NMS 610, can be in communication with system 1000. In another failure scenario, an alarm can be received which indicates an Ethernet port failure. NMS 610 can open trouble tickets with NOC 680 for layer two or layer three root cause troubles with affected customers/services for trouble dispatch upon notifying TNC 690 to suppress its monitoring domain alarms. The IPTV services are impacted by this failure scenario.

Figure 11:
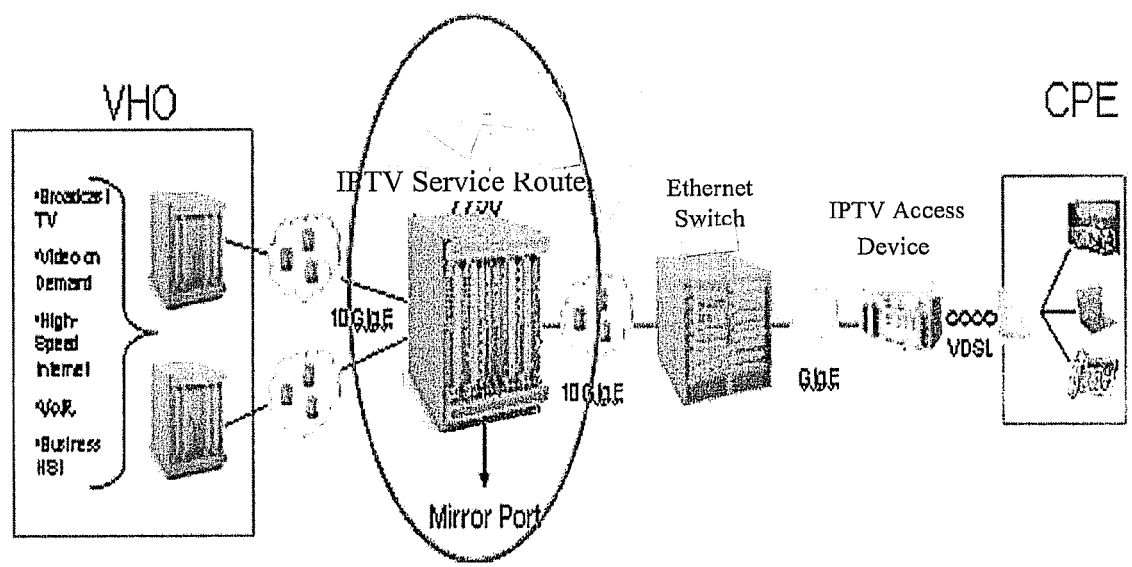
FIGS. 11 and 12 depict exemplary methods operating in portions of the communication systems of FIGS. 1-4 and 6-10.

FIG. 11 depicts an exemplary method 1100 operating in portions of the communication systems 100, 200, 300, 400, 600, 700, 800, 900 and/or 1000. It would be apparent to an artisan with ordinary skill in the art that other embodiments not depicted in FIG. 11 are possible without departing from the scope of the claims described below. Method 1100 includes a number of steps for performance of the testing of a failure. The steps can include initializing the shelf and gathering information needed for testing; connecting the remote test sets; terminating the 10 GE links; configuring each test set to generate a traffic stream; checking throughput stats and verify there are no errors; and so forth. Other testing can be performed, such as in compliance with IEEE 802.3.

Figure 12:
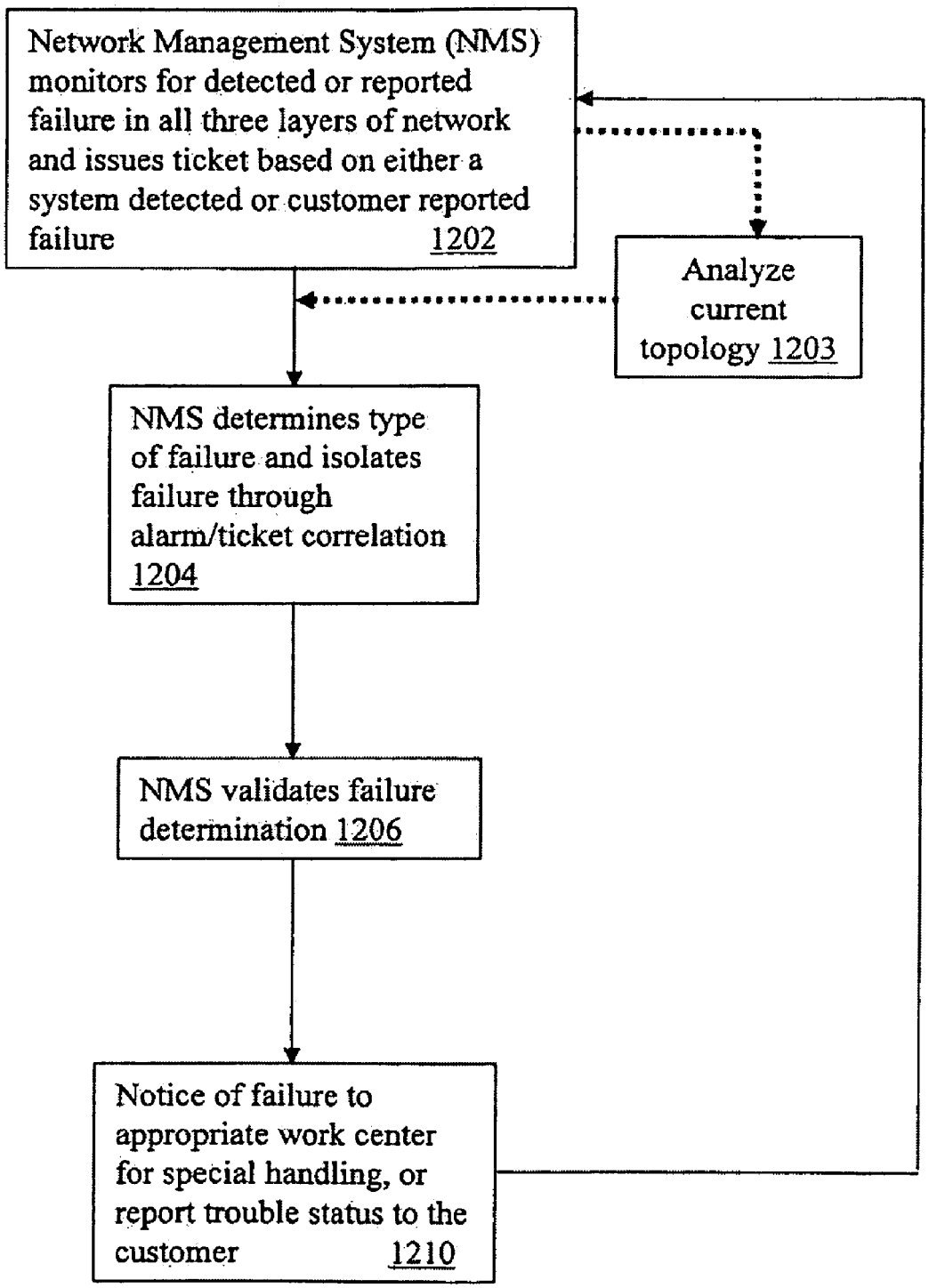

FIG. 12 depicts an exemplary method 1200 operating in portions of the communication systems 100, 200, 300, 400, 600, 700, 800, 900 and/or 1000. Method 1200 has variants as depicted by the dashed lines. It would be apparent to an artisan with ordinary skill in the art that other embodiments not depicted in FIG. 12 are possible without departing from the scope of the claims described below.

Method 1200 can begin with step 1202 in which the NMS 610 monitors for detected failures or reported failures. The monitoring can be performed for layer one (physical layer), layer two (data link layer) and layer three (network layer) of the network. Based on the monitoring, the NMS 610 can issue tickets to the NOC 680 or the TNC 690. For instance, if there is both an LOS alarm and a NetworkConnectionDown for the same 10 GiG Facility Circuit Id, Alarm Management can generate a root cause notification against the combined LOS/NetworkConnection problem with the appropriate impacts/systems. This information can be passed to Rule Management via the Alarm Management for ticket creation in Ticketing Management. If there is no LOS alarm, the NetworkConnectionDown notification can handoff to the Rule Management. Rule Management can utilize IPTV Topology Databases and determine the DWID(s) associated with the 10 Gig Facility, such as a Dense Wavelength Division Multiplexer (DWDM). The Rule Management can query the Ticketing Management and see if there is already a ticket for the DWID or circuit id, which otherwise would not have been identified as IPTV service impacting. If a ticket exists, Rule Management can add this notification to the existing ticket. If a ticket does not exist, Rule Management can create a ticket on a newly identified problem and route to appropriate work center.

In one embodiment in step 1203, the NMS 610 can retrieve current topology information for the network, such as stored in the topology database 625. In this embodiment, the dynamic architecture of the network can be accounted for by monitoring for and storing current topology data. The monitoring can be performed in a number of ways. For instance, queries can be performed on one or more of the network devices. As another example, the network devices can send via Wireless and/or wired links performance data or other information, including alarm signals to the NMS 610. The transmission of the performance data can be in response to a query or based on other criteria, including undesired conditions, scheduled information exchanges and so forth.

In step 1204, the NMS 610 can determine the type of failure and can isolate the failure through correlation of the alarms and generated tickets. For instance, a root cause of a plurality of alarms can be determined by analyzing the topology of a portion of the network and determining what components could be effected by an undesired condition. The correlation determination can include determining how an undesired condition atone network component effects the performance of other network performance. The layers of the network can be considered for this determination. For instance, an IPTV Access Device, a ROADM and a cable (e.g., an optical fiber or physical cable) can be consider as Layer 1 equipment, an IPTV Ethernet Switch can be considered as Layer 2 equipment, an IPTV Service Router can be considered as Layer 3 equipment, For example, the following table shows alarm correlation algorithms that can be applied by NMS 610:

In step 1206, the NMS 610 can perform validation procedures to confirm the accuracy of the failure determination to ensure IPTV circuit is up and clean. For instance, remote testing can be performed on a device detected as being in failure or having an undesired condition. The particular remote device performing the validation test can be selected based on a number of factors, including the current topology of the network as determined from database 625. In step 1210, NMS 610 can provide a notice of service failure. The notice of service failure can be transmitted to the customer and/or a work center, such as NOC 680 and TNC 690.

From the foregoing descriptions, it would be evident to an artisan with ordinary skill in the art that the aforementioned embodiments can be modified, reduced, or enhanced without departing from the scope and spirit of the claims described below. For example, other information can be utilized to determine the type of service failure and/or isolate the failure in addition to or in place of the alarms, tickets and/or network topology. For instance, the network devices can forward connectivity and/or telemetry data to the management system 610, such as without requiring a query from the management system.

These are but a few examples of the modifications that can be applied to the present disclosure without departing from the scope of the claims. Accordingly, the reader is directed to the claims for a fuller understanding of the breadth and scope of the present disclosure.

Other suitable modifications can be applied to the present disclosure without departing from the scope of the claims below. Accordingly, the reader is directed to the claims section for a fuller understanding of the breadth and scope of the present disclosure.

TABLE 1

| Layer 1/2/3 Alarm Correlation | Root-Cause Notification to Work Center |
| --- | --- |
| When Alarm Management (AM) receives a Physical Port Down event from the IPTV Access Device (e.g., a DSLAM) in the Layer 1 domain and Port Down and interface Down events from the Layer 2 domain, then Rule Management (RM) correlates these symptoms and notifies Cable Down. The Rule Management server correlates that Cable Down in the Layer 1 domain causes the Port Down and Interface Down events in the Layer 2 domain and Physical Port Down in the Layer 1 domain. | Layer 1 Cable Down Between Switch and IPTV access device |
| When AM receives a Card Down event and Interface Down event from the Layer 2 domain and a Physical Port Down event from the IPTV access device in the Layer 1 domain, then RM correlates that Card Down in the Layer 2 domain is the root cause causing the Interface Down event in the Layer 2 domain and the Physical Port Down event in the Layer 1 domain. | Layer 2 Card Down on Switch |
| When AM server receives Switch Down and Interface Down events from the Layer 2 domain and a Physical Port Down event from the IPTV access device in the Layer 1 domain, then RM correlates that Switch Down in the Layer 2 domain is the root cause causing the Interface Down events in the Layer 2 domain and the Physical Port Down event in the Layer 1 domain. | Layer 2 Switch Down |
| When AM server receives a Card Down event from the IPTV access device in the Layer 1 domain and Port Down and Interface Down events from the Layer 2 domain, then RM correlates that the Card Down event in the Layer 1 domain is the root cause causing the Port Down and Interface Down events in the Layer 2 domain. | Layer 2 Card Down on IPTV access device |
| When AM server receives a Card Down event from the IPTV service router in the Layer 2 domain and a Logical Port Down event from the Layer 1 domain, then RM correlates that the Card Down event in the Layer 2 domain is the root cause causing the LogicalPort Down event in the Layer 1 domain. | Layer 3 Card Down on Router |
| When AM receives Interface Down event from the router and Port Down from the switch in the Layer 2 domain and Logical Port Down in the Layer 1 Manager domain, then RM correlates these symptoms and notifies Cable Down. The RM server correlates that Cable Down in the Layer 2 domain causes the Interface Down and Port Down events in the Layer 2 domain and Logical Port Down in the Layer 1 domain. | Layer 1 Cable Down Between Router and Switch |

Figure 13:
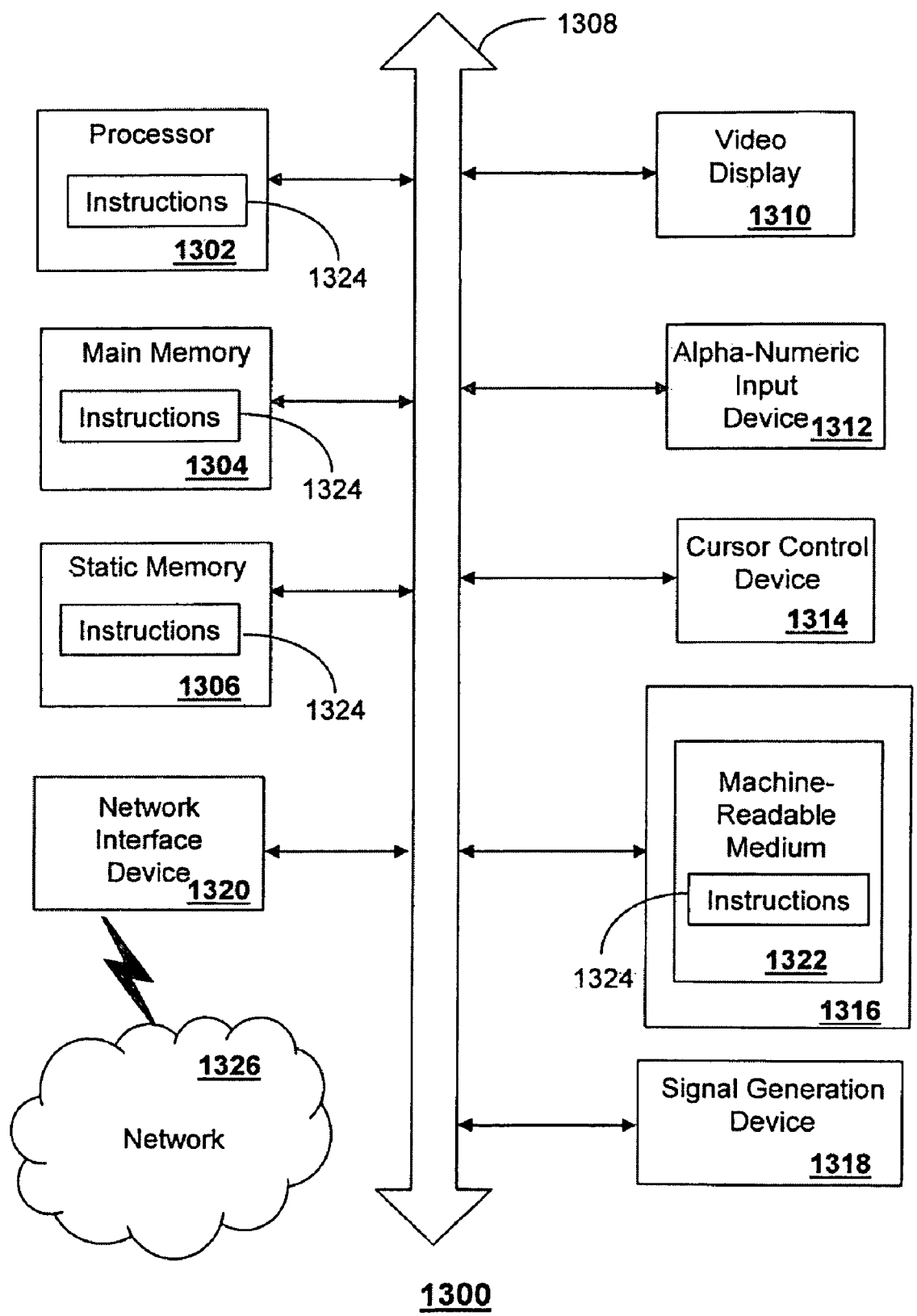
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including; but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising computer instructions for:
    monitoring a physical layer, a data link layer and a network layer of an Internet Protocol Television (IPTV) network;
    obtaining a plurality of alarm signals from one or more of the physical layer, the data link layer and the network layer that are associated with an undesired condition of the IPTV network;
    obtaining one or more customer reports associated with the undesired condition;
    synthesizing the plurality of alarm signals and the one or more customer reports to determine a correlation;
    obtaining topology information associated with network devices in the IPTV network;
    isolating the undesired condition to a network component in the IPTV network using the correlation and the topology information; and
    performing remote testing of the network component to validate the isolation of the undesired condition.

2. The non-transitory computer-readable storage medium of claim 1, comprising computer instructions for transmitting a notification of the undesired condition to a repair center.

3. The non-transitory computer-readable storage medium of claim 1, comprising computer instructions for transmitting a notification of the undesired condition to a customer.

4. The non-transitory computer-readable storage medium of claim 1, comprising computer instructions for performing remote testing of another network component in the IPTV network to determine the stability of a circuit operably coupled with the network component.

5. The non-transitory computer-readable storage medium of claim 1, comprising computer instructions for suppressing domain alarms.

6. The non-transitory computer-readable storage medium of claim 1, wherein the plurality of alarm signals that are obtained are from each of the physical layer, the data link layer and the network layer.

7. The non-transitory computer-readable storage medium of claim 1, comprising computer instructions for determining a type of undesired condition to isolate the undesired condition to the network component.

8. The non-transitory computer-readable storage medium of claim 1, wherein the undesired condition is one of a fiber cut and an Ethernet port failure.

9. A server comprising a controller to:
    monitor a physical layer, a data link layer and a network layer of an Internet Protocol Television (IPTV) network;
    obtain a plurality of alarm signals from one or more of the physical layer, the data link layer and the network layer that are associated with an undesired condition of the IPTV network;
    synthesize the plurality of alarm signals to determine a correlation;
    obtain topology information associated with network devices in the IPTV network; and
    isolate the undesired condition to a network component in the IPTV network using the correlation and the topology information.

10. The server of claim 9, wherein the controller is adapted to:
    obtain one or more customer reports associated with the undesired condition; and
    synthesize the plurality of alarm signals and the one or more customer reports to determine the correlation.

11. The server of claim 10, wherein the plurality of alarm signals that are obtained are from each of the physical layer, the data link layer and the network layer.

12. The server of claim 9, wherein the controller is adapted to perform remote testing of the network component to validate the isolation of the undesired condition.

13. The server of claim 9, wherein the controller is adapted to transmit a notification of the undesired condition to at least one of a repair center and a customer.

14. A server comprising a controller to:
    monitor an Internet Protocol Television (IPTV) network having a physical layer, a data link layer and a network layer;
    obtain a plurality of alarm signals from one or more of the physical layer, the data link layer and the network layer that are associated with an undesired condition of the IPTV network;
    obtain one or more customer reports associated with the undesired condition;
    synthesize the plurality of alarm signals and the one or more customer reports to determine a correlation;
    isolate the undesired condition to a network component in the IPTV network using the correlation; and
    perform remote testing of the network component to validate the isolation of the undesired condition.

15. The server of claim 14, wherein the controller is adapted to:
    obtain topology information associated with network devices in the IPTV network; and
    isolate the undesired condition to the network component using the correlation and the topology information.

16. The server of claim 14, wherein the plurality of alarm signals that are obtained are from each of the physical layer, the data link layer and the network layer.

17. The server of claim 14, wherein the controller is adapted to determine a type of undesired condition to isolate the undesired condition to the network component.

18. The server of claim 17, wherein the controller is adapted to transmit a notification of the undesired condition to at least one of a repair center and a customer.

19. The server of claim 17, wherein the controller is adapted to perform remote testing of another network component in the IPTV network to determine the stability of a circuit operably coupled with the network component.

20. A network device comprising a controller to transmit a plurality of alarm signals to a management server, wherein the plurality of alarm signals indicate an undesired condition associated with each of a physical layer, a data link layer and a network layer of an Internet Protocol Television (IPTV) network, wherein the undesired condition is isolated by the management server to a network component in the IPTV network using a correlation and topology information, wherein the correlation is determined by the management server using the plurality of alarm signals and one or more customer reports associated with the undesired condition, and wherein the topology information is associated with network devices in the IPTV network.

21. The network device of claim 20, wherein the controller is adapted to periodically transmit performance data to the management server over a wired link and a wireless link.

22. A method of managing an internet protocol media network, comprising:
- monitoring a physical layer, a data link layer and a network layer of the network;
- obtaining a plurality of alarm signals from one or more of the physical layer, the data link layer and the network layer that are associated with an undesired condition of the network;
- obtaining one or more customer reports associated with the undesired condition;
- synthesizing the plurality of alarm signals and the one or more customer reports to determine a correlation;
- obtaining topology information associated with network devices in the network; and
- isolating the undesired condition to a network component in the network using the correlation and the topology information.

23. The method of claim 22, comprising performing remote testing of the network component to validate the isolation of the undesired condition.

24. The method of claim 22, wherein the internet protocol media network is one of an internet protocol television network, a satellite television network, a cable television network or combinations thereof.

25. The method of claim 22, comprising determining a type of undesired condition to isolate the undesired condition to the network component, wherein the plurality of alarm signals that are obtained are from each of the physical layer, the data link layer and the network layer.

* * * * *